June 2, 1936.  W. B. FOGH  2,042,932
BARGE FOR TRANSPORTING LOGS AND THE LIKE
Filed Feb. 3, 1934   5 Sheets-Sheet 2
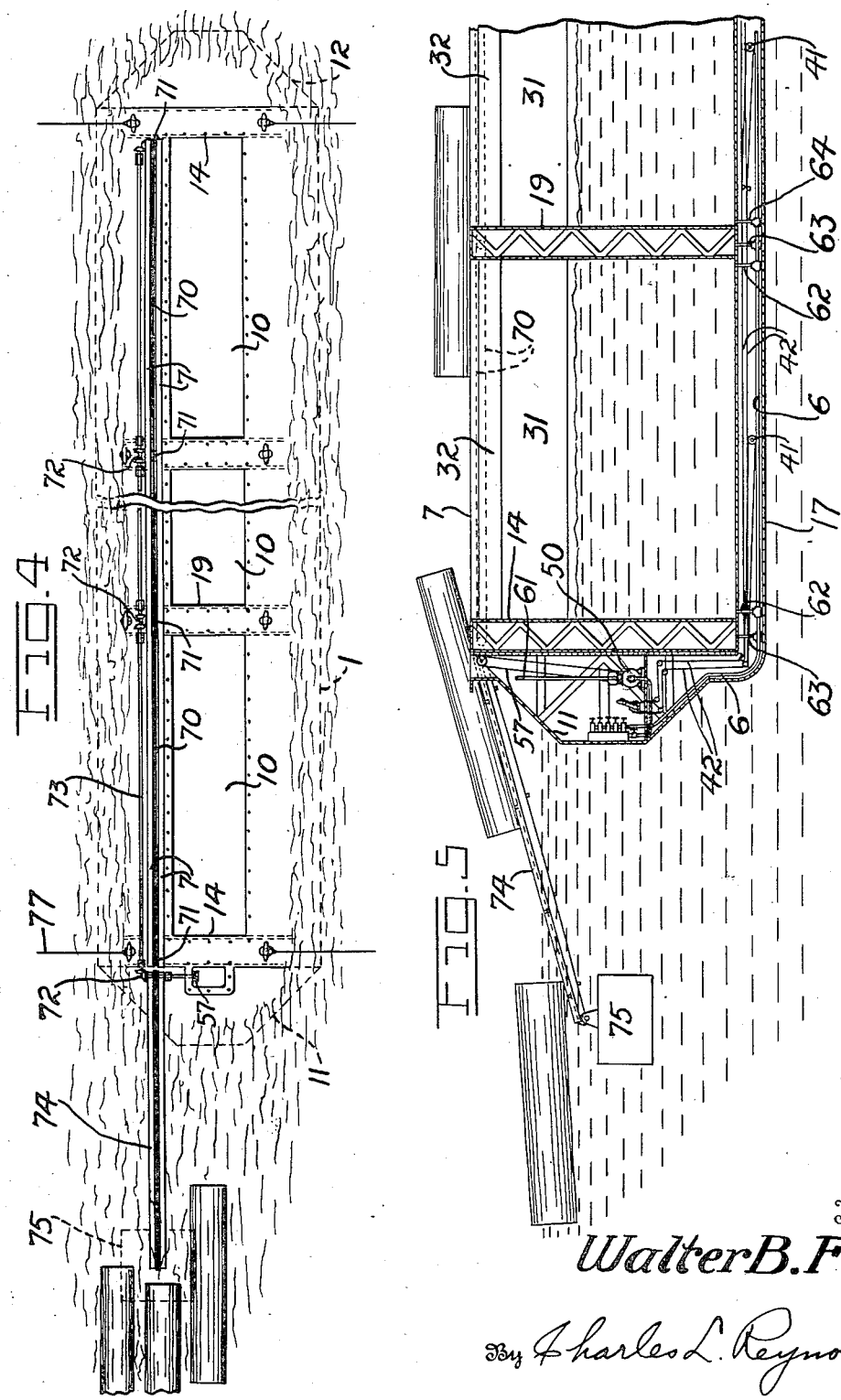
Inventor
Walter B. Fogh
By Charles L. Reynolds
Attorney

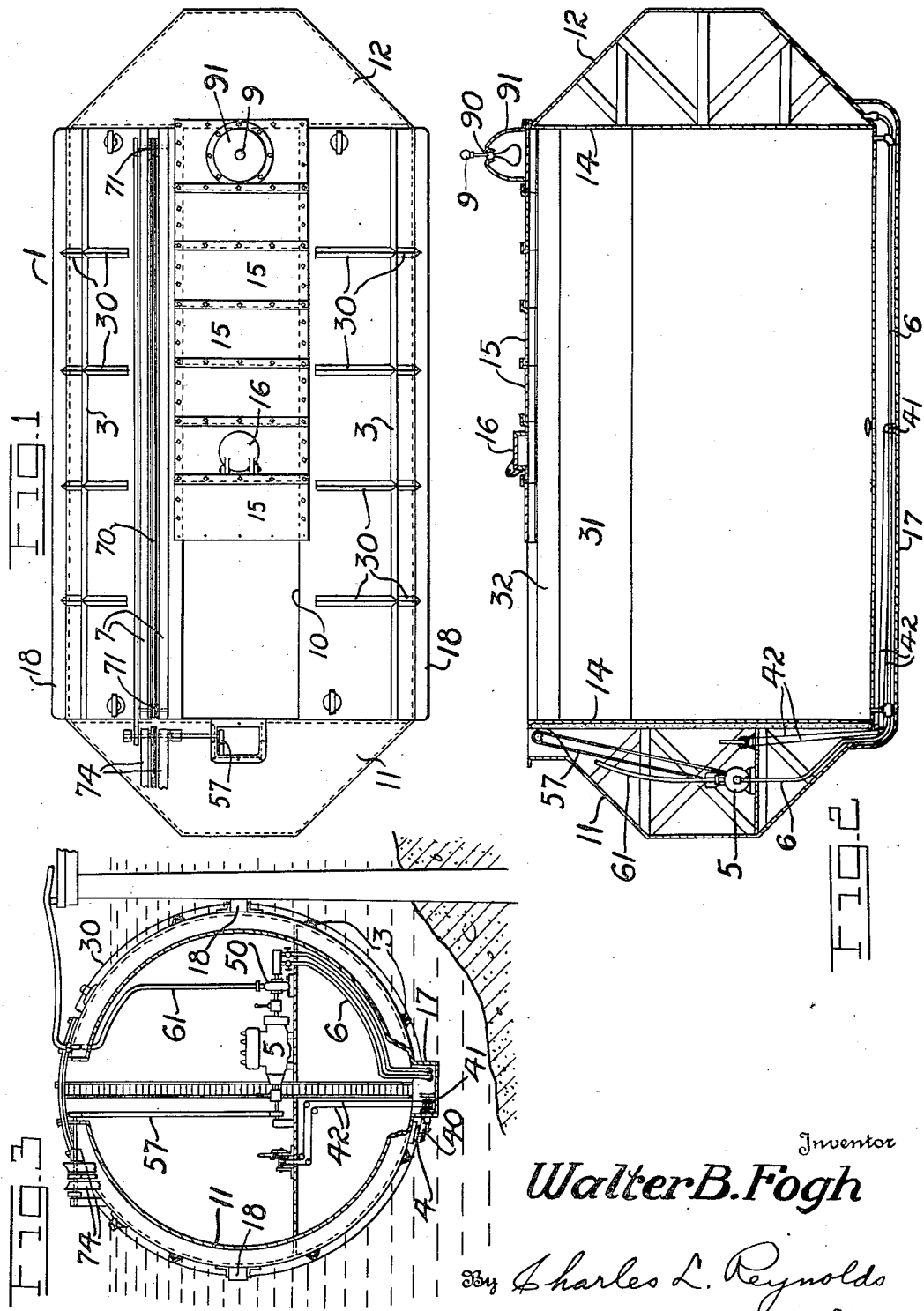

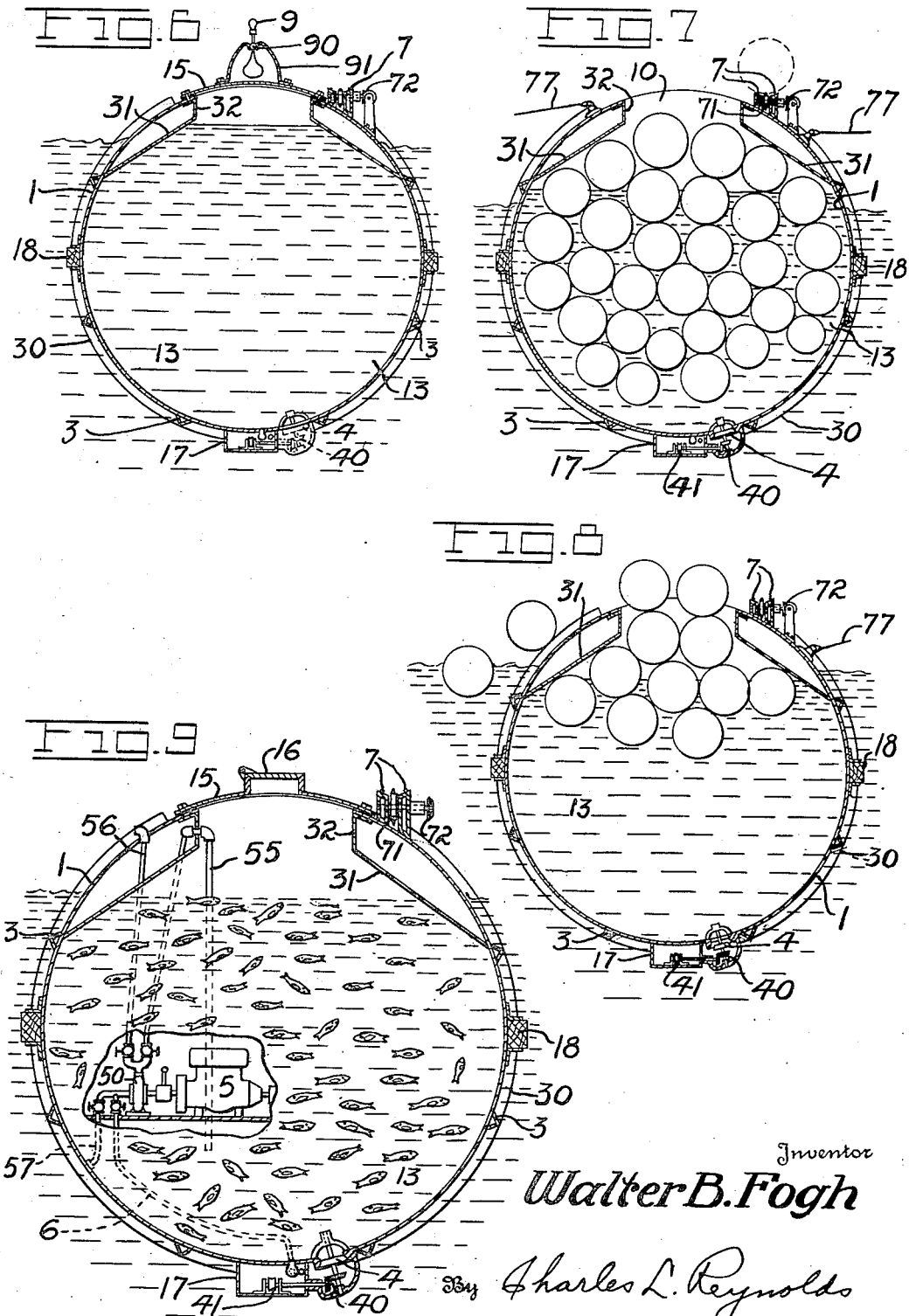

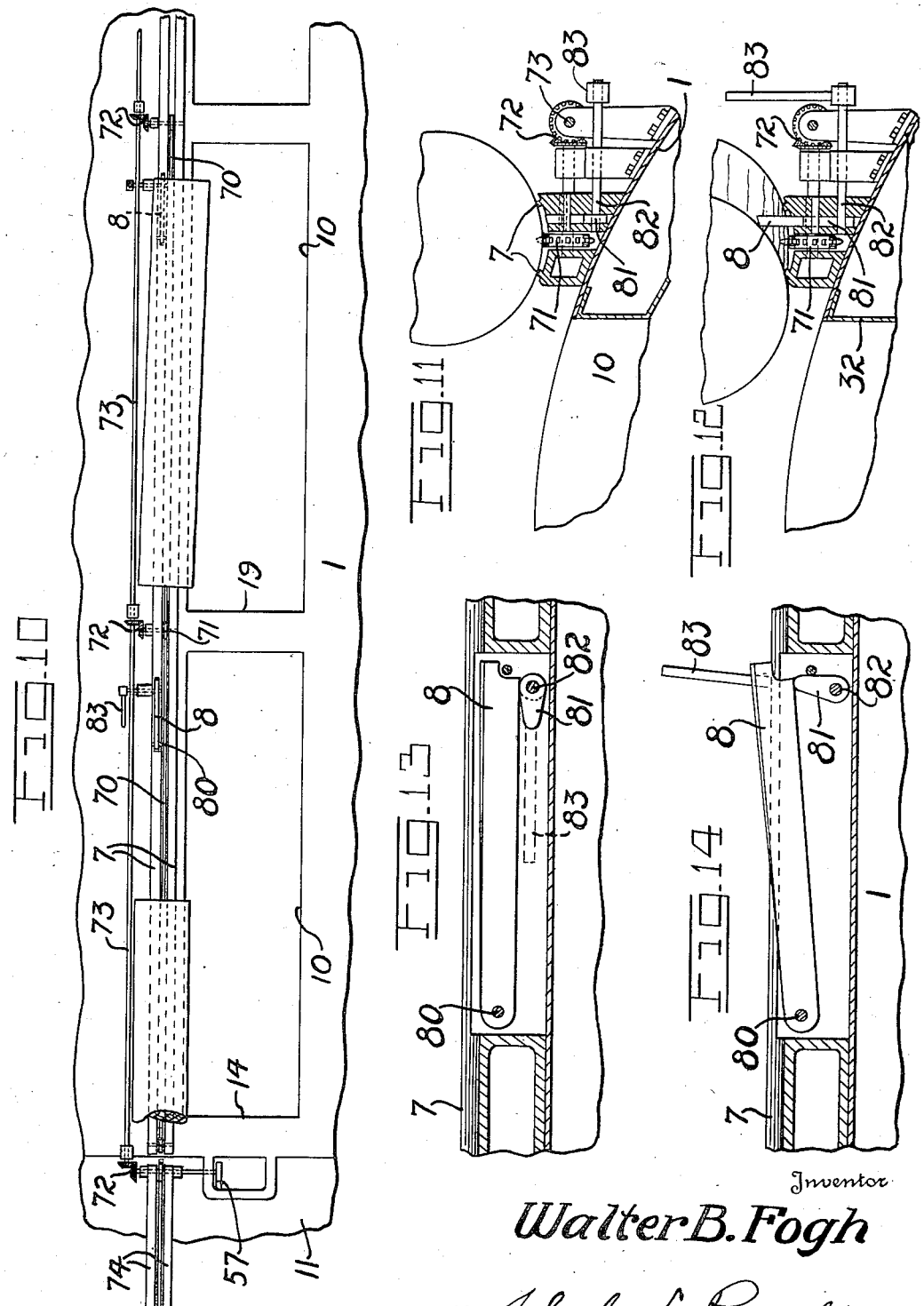

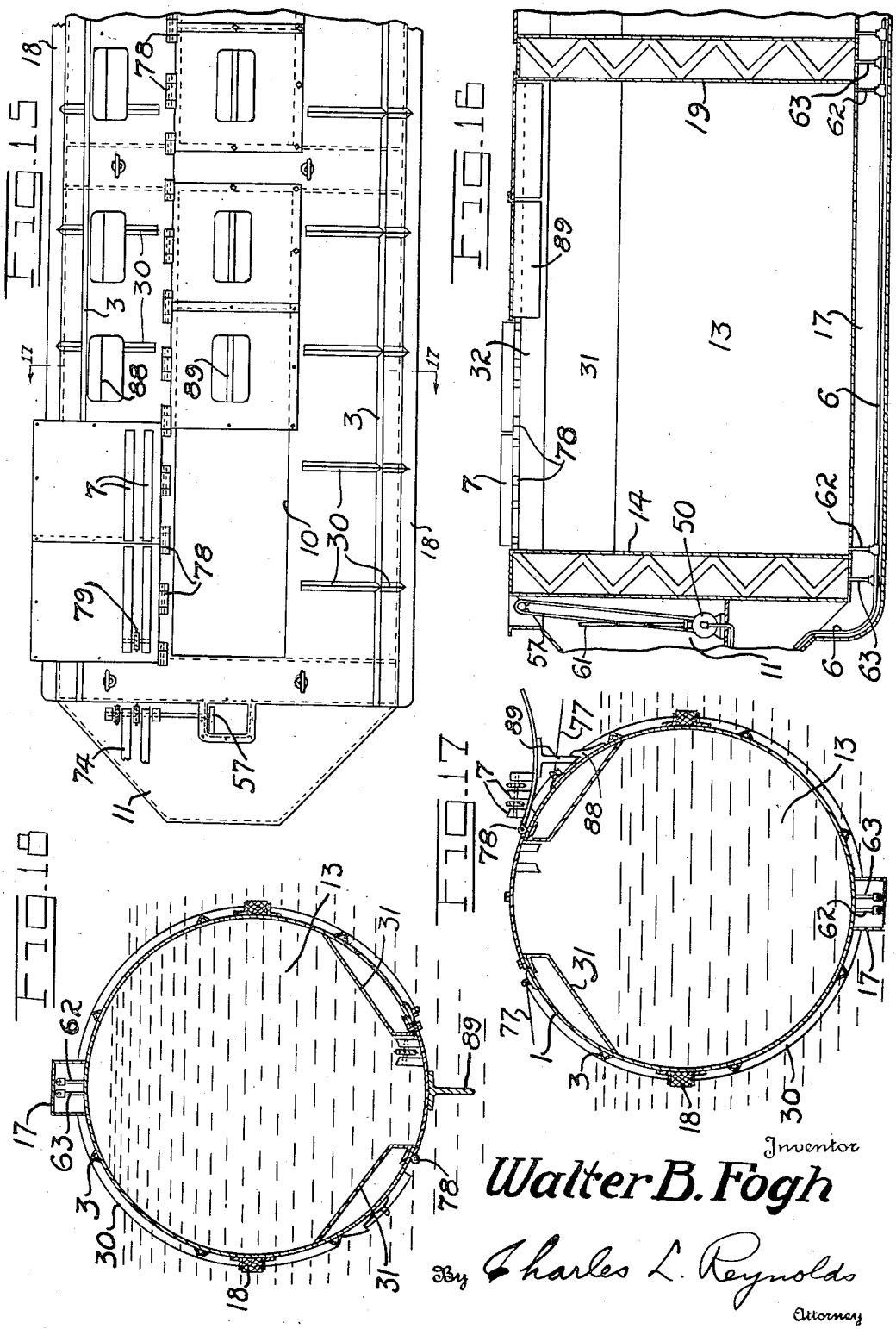

Patented June 2, 1936

2,042,932

UNITED STATES PATENT OFFICE 2,042,932

BARGE FOR TRANSPORTING LOGS AND THE LIKE

Walter B. Fogh, Seattle, Wash.

Application February 3, 1934, Serial No. 709,627

9 Claims. (Cl. 114—72)

My invention relates to water transportation, and has as its general object to lessen the cost of such transportation, particularly in lessening the initial and upkeep cost of containers or vessels wherein certain types of cargo is to be transported.

My invention is adapted to the transportation of various kinds of cargo. For example, it may be used on the Pacific coast for the transportation of oil, gasoline, or like products in bulk, from Southern California ports to Puget Sound ports, and for the transportation on the return journey of logs and like floatable cargo from Pacific Northwest ports to California ports, or for transportation of gasoline from Texas to Maine, and of logs on the return trip. It may be used for the live storage of fish when caught, and for their transportation from the fishing banks to ports, and many other uses will suggest themselves as this specification progresses.

Especially in connection with the transportation of logs, it is an object to provide a device and a method of handling and transporting the logs, whereby what are in effect log rafts may be formed at minimum expense in equipment and time, with no greater added weight than is now commonly used in cables, chains, etc., and in waters where there is permitted a minimum draft, and whereby the logs may be readily discharged with little trouble or expense at the point of delivery, without damage during transportation or discharge to the enclosing shell.

It is an object to provide a vessel which can be readily adapted to the transportation of various kinds of cargo, such as the various cargoes mentioned above, and others.

It is especially an object to provide a vessel for such uses which can be cheaply constructed, and which, by reason of the method of employment, is but little subjected to the normal stresses of cargo vessels in heavy weather, and which lessens the strain of towing.

These and other objects of my invention will be better understood as this specification progresses, and I do not deem it necessary to touch on such objects more specifically at this point.

My invention is concerned with the inventive concept of transporting various types of cargo (particularly cargo which is liquid or can be immersed in liquid, and which, with such liquid, is as a whole of less specific gravity than the water displaced) cheaply and conveniently, and of loading and handling the cargo with facility. Where the storage of such cargo, as oil, would require expensive shore facilities, my invention is further concerned with the economical storage thereof pending and during local or partial deliveries. The accompanying drawings illustrate the principles of my invention embodied in various types of vessels and cargoes, the drawings being more or less diagrammatic in character.

Figure 1 is a plan view, Figure 2 is an axial section, and Figure 3 is a transverse section at one end, of such a vessel, in what is substantially the simplest form thereof.

Figure 4 is a plan view, and Figure 5 is an axial section, illustrating the operation of loading logs into such a vessel.

Figure 6 is a transverse section through such a vessel, loaded with liquid cargo, such as oil.

Figure 7 is a transverse section of such a vessel, illustrating the operation of loading logs, and Figure 8 is a similar view, illustrating the operation of discharging such logs.

Figure 9 is a transverse section through such a vessel, illustrating the manner of its use in the transportation of live fish.

Figure 10 is a fragmentary plan view of such a vessel, illustrating the mechanism for loading logs; Figures 11 and 12 are transverse sections, and Figures 13 and 14 are vertical longitudinal sections, all illustrating apparatus used in the loading of logs.

Figure 15 is a plan view of a modified vessel, the difference residing chiefly in the manner of support of the log-loading apparatus; Figure 16 is a vertical longitudinal axial section therethrough, and Figure 17 is a transverse section.

Figure 18 illustrates a variation in the method of transporting cargo with such a vessel.

In effect the invention makes use of a hollow, substantially cylindrical shell of metal, which is substantially unbraced, internally and externally, and which therefore has a large and unobstructed hold within which can be received the cargo, whereby, provided the weight of the cargo plus the vessel is less than that of the water displaced, the vessel will float, though in most instances, and preferably, almost submerged. Now if the cargo is liquid, such as oil or gasoline, or may be immersed in water, such as logs, and yet fulfill these conditions of buoyancy, the vessel will float so low that it is not subject to ordinary wave action, and the liquid within the vessel, whether it is sealed from the sea, in the case of oil, or in free communication with the sea, as in the case of logs immersed in water, will serve as internal bracing, whereby to prevent collapse of the vessel and to resist such action of the sea as may be impressed upon it. However, since the vessel floats nearly submerged, waves will wash over it, and will not damage the shell, for there is little wave action or stresses beneath the surface, and the cylindrical shape is little subject to damage, and facilitates the waves washing over the shell. This gives to the vessel the further advantage that it does not surge with wave action, and therefore permits a more steady towing effort to be applied to it, and, as well, lessens towing strains on the tug, tow line, and towing engine.

Such a vessel may readily be loaded with various kinds of cargo, and as pointed out above, it will be particularly useful in handling gasoline, oil and the like in large quantities, originating at California ports and discharging at Pacific Northwest ports, or at Siberian ports, and on the return voyage may be loaded with logs for delivery at California ports.

Logs have been transported heretofore over long distances by building large cribs into which the logs are lifted, where they are bound by cables or chains into cigar-shaped rafts, some of which carry many hundreds of thousands of feet of timber. It will be obvious, however, that the construction of such rafts in itself constitutes an item of considerable expense, and when the logs are on the high seas the safety of the entire raft is dependent upon the strength of the chains which bind them together. If any single log breaks away, it endangers the safety of the entire raft. The heavy cables chafe, and are not usable after the raft is broken up, while the shell is not damaged during such use. According to my invention the logs may be loaded loosely into the vessel, the weight of which does not exceed the weight of cables used to bind an equivalent volume of logs into a raft. There these logs in effect float in the water contained within the vessel, being restrained from emerging, and need not be bound nor secured in any way except by the restraint of the outer walls of the vessel, and if the vessel rolls, the logs will not roll, since they are not subject to wave action. Thus large quantities of logs can be towed safely over long distances, and other advantages will appear hereafter with relation to the loading and discharging of such logs.

Thus as is illustrated in Figures 1, 2, and 3, the vessel comprises a cylindrical shell 1, having a hatch opening 10 at one side, of a length substantially equal to the length of the cylindrical shell, and of a width sufficient to take the logs. Such a shell may be 45 feet or slightly more in length and from 20 to 40 feet in diameter, and preferably is built in multiples of such length. This length is selected to accommodate 40-foot logs such as are normally transported in rafts. For ease in towing, the shell may be provided with conical ends 11 and 12 separated from the main hold 13 by transverse bulkheads 14, and to close the hatch opening 10 hatch cover means, such as the sectional cover 15, may be secured in place, when the cargo has been loaded into the vessel, or, if the cargo is liquid, such as oil, the cargo may be loaded and discharged through a suitable aperture closed by the plate 16. To keep the vessel reasonably upright it may be provided with a keel, illustrated at 17, which may be suitably ballasted or within which may be placed various operating machinery, as will appear hereafter, the weight of which serves as ballast. However, as will appear hereafter, it may be preferable to dispose the weights in such manner that the vessel floats when loaded, with the hatch opening downward, whether the cargo be oil or such as logs. Rolling, however, is not objectionable, since it eases the force of surface waves. A light 9, as required by marine regulations, may be supported in a swivel mount 90 upon a standard 91 raised above the top of the vessel.

The conical sections 11 and 12 may well be braced and suitably connected for draft to the clylindrical shell 1 by means such as are indicated diagrammatically in Figure 2, but preferably the entire space within the cylindrical shell 1 is free from obstructions. The shell may be formed of plates butt welded or otherwise secured together, and to protect the weld and to somewhat stiffen the shell, angle irons 3 and 30 may be employed. These may be placed inside the shell, but preferably are placed outside, whereby the logs may have no point of engagement inside the shell. Further to stiffen the vessel along the margins of the long hatch opening 10 which is necessary to receive 40-foot logs, there may be secured in place stiffening plates 31 and 32, forming in effect a triangular truss along each margin of the hatch opening. However, these project but slightly into the hold, and in effect do not obstruct the interior thereof to any appreciable extent. Rather they serve as smooth chutes to guide the logs as they emerge, as will be clear hereafter.

Since it will be necessary at times to open the interior of the hold to free communication with the water outside it, if the vessel is to float with the hatch opening on top, I may provide a series of sea cocks 4 disposed in the lower portion of the shell 1, and arrangements may be made to open these by a bevel gear connection or like means, as illustrated at 40, operated by suitable mechanism, for instance a pulley 41, disposed within the hollow keel 17 and connected to a control station by such means as the lines 42. This control station may well be one of the conical ends of the vessel, wherein may be located a motor 5, and wherein is preferably located also a pump 50 for discharging water from the interior of the shell or for handling the oil cargo.

It is not at all essential that the vessel be formed with a single hold only, but rather it is preferable that it be of a length equal to a number of such holds, but the several holds are separated by bulkheads 19, which may be single or double and braced, as illustrated in Figure 5. If the individual holds were much in excess of the length of the logs, the latter would interlock and jam within the hold, but by making the individual holds just slightly in excess of the length of the logs, the latter all remain parallel within the hold, and do not have a chance to move about, except as the shell rolls relatively to the logs, which are substantially quiescent.

If desired, the space between double bulkheads may be employed as storage space for special liquid cargo. Thus if the vessel is hauling gasoline, it may well carry a cargo of kerosene or distillate between the walls of the double bulkheads 19, and suitable arrangements will be provided for the discharging of such cargo. Thus as seen in Figure 5, a pipe 6 is provided within the hollow keel leading to the pump 50 and thence to a discharge pipe 61, and to this pipe 6 are connected various branch pipes 62, 63 and 64 leading to different holds or storage spaces.

It is desirable to provide on the shell itself mechanism for loading logs. Such mechanism may be mounted on the exterior of the shell, as in Figures 6 to 9 for example, or preferably on the inner side of the hatch cover, as in Figures 15 to 18. To this end I provide spaced rails 7, and between them extends a chain, cable or like device, illustrated at 70, provided with dogs or like means for conveying logs along the rails 7, or toothed wheels 71 may be provided at intervals located between the rails to engage the logs from beneath and to advance them. Such advancing means may be conveniently driven by bevel gear connections illustrated at 72 from a main shaft 73 supported in suitable brackets alongside the rails 7, and this mechanism may conveniently be driven from the motor 5 by the belt or chain connection at 57. Logs are preferably loaded from the end of the shell, and to facilitate this, extension rails 74 may be provided depending into the water and supported, if necessary, by a float 75, in alignment with the rails 7. Thus the rails 74 and suitable power means associated therewith, as is common in the art of handling logs, constitutes a log ramp or elevator, by means of which logs can be lifted from the water and then moved along the rails 7 until they come opposite a hatch opening 10 into which it is desired to discharge them.

For discharging the logs into a selected hold I may provide a shoe 8, pivoted at 80 between the rails 7, and adapted, when raised by movement of the cam lever 81 about its pivot 82, to deflect a log in the manner illustrated in Figures 10 and 12, whereby as the log comes opposite a given hatch opening 10 it may be rolled off into this hatch opening, and thus the vessel may be loaded without the necessity of a crane or like arrangement for bodily lifting the logs. The loading may thus be effected at any convenient point, without dependence on shore installation. The logs are dropped into water which partly fills the hold, thus preventing damage to the shell. Moreover, they will naturally find their position relative to other logs buoyed up by the water in the shell, and stevedoring labor in stowing the logs (always dangerous) will be eliminated.

Movement of the cam lever 81 is controlled in any convenient manner, the control being typified by the lever 83, though it will be evident that any suitable arrangement for this purpose may be employed.

When the vessel is being loaded with oil the oil may be discharged through the opening closed by the plate 16, the various hatch covers 15 being left in place, except for an opening to permit air to escape from the interior. The shell would be of such capacity that the weight of the oil plus the weight of the shell would be less than the weight of the water displaced by the shell, and thus the shell could be loaded substantially full, and would still float, though largely submerged, as seen in Figure 6. In this condition it may be towed, a towing bridle (not shown) being attached in any suitable manner, for instance to the end of the guard rails 18. In heavy weather the waves will wash over the shell, and will cause no damage, and any pounding or stresses to which it may be subjected will be resisted by the incompressible liquid cargo, and the shell therefore needs no bracing inside.

The oil having been discharged, immediately or from time to time, at the point of destination, the hatch covers 15 may be removed, and the vessel may then be partly filled with water, so that it floats, largely submerged, after the fashion shown in Figures 4, 5, and 7. In this condition logs may be loaded in the manner heretofore described, and the only precaution necessary is to provide guy lines 77 extending laterally to anchors or other fixed points, whereby the shell will not roll the hatch opening under water. Logs are loaded in until they substantially fill the hold, those above pressing down those first loaded until most of the logs are submerged in the water within the shell. The hatch covers may then be replaced to restrain the logs from emerging, whereupon the sea cocks 4 may be opened to place the interior of the shell in free communication with the water outside, but by reason of the buoyancy of the logs within, the shell cannot sink. It may roll as much as necessary, though because it is largely submerged the tendency to rolling will not be pronounced, and in this way the logs may be transported over long distances, and the loading requires no special equipment and but a slight amount of time as compared to the building of sea-going rafts. Upon reaching the point of discharge for the logs the sea cocks may be closed, the water partly or wholly removed from the hold in order to relieve pressure from within against the hatch covers, and after the hatch covers are removed additional water will be admitted to the hold to float the logs out, whereupon they will emerge by reason of the pressure of logs from below, in the manner illustrated in Figure 8, and this again requires no special equipment. The last few logs can be removed by rolling an edge of the hatch opening under water, whereupon the logs will float out. The conical ends, or these ends plus the space between the double bulkheads, will provide sufficient buoyance at such times to prevent sinking of the shell. If preferred, the logs may be retained in the shell, and removed as needed, thus conserving booming space, which may be limited.

The vessel may be used for transporting live fish from the fishing banks to market, and such a use is illustrated in Figure 9. It may serve also for the live storage of fish, either at the fishing banks or at a market. It will be necessary, of course, to maintain a certain amount of buoyancy in the vessel, so that it should not be completely filled with water, but the hatch covers may be closed down tightly, retaining an air space for buoyancy above the level of water within the shell, and the fish may be supplied with fresh water through the pumping system illustrated, stale water being taken out through the line 55 and discharged overboard by the line 56, and fresh water being taken in from the line 57. This eliminates any necessity for aerating the water within the shell, and in this manner live fish may be kept for considerable periods and transported over long distances, and will arrive at the market alive and fresh. The space between double bulkheads may serve as storage tanks for fuel oil or gasoline for the fishing vessels, or one or more of the holds may be so employed, until it is needed for fish.

Since oil tends to rise to the surface of water, as do logs, it is preferable to invert the vessel, as illustrated in Figure 18, after loading. The hatch covers then need not be tight, for if water enters the vessel it merely causes the oil to float above it. Being restrained by the continuous shell above, the oil cannot escape, and the vessel is so little subject to rolling that no oil escapes. Such a vessel, loaded with oil, struck an obstruction which tore out the bottom over an area of about ten square feet, yet but little oil was lost, and that largely during unloading, though it had to be towed in that condition a distance of about fifteen miles.

The log loading equipment may be mounted on the inside of the hatch covers 15, as shown in Figures 15 to 18, inclusive. The latter are hinged at 78 to the shell, and if they are formed in sections, the log rails 7 may also be formed in sections. If a cable or chain 70 is used, it may, in such cases, be rigged over the pulleys or sprocket wheels 79 whenever the equipment is to be used, being stored in the end compartments, or elsewhere, when not in use. By throwing back the hatch covers, resting stanchions 89 in supports 88, the log loading equipment is quickly made ready for use, the vessel being stayed in loading position against rolling by stay lines 77. When the vessel is loaded the hatch covers are thrown down into place to restrain the logs, and the stay lines are released, whereupon the vessel inverts itself, and, if the hatch covers are not water-tight, completes the filling with water. It is then ready for towing. Analogous procedure may be employed with an oil cargo. The log loading equipment may, in such cases, serve as ballast, or if additional ballast is required it may be contained between the plates 31 and 32 and the shell. To reinvert the shell it is only necessary to secure lines across the top to a distant side, and to pull on them, securing the stay lines 77 as the vessel rolls, in order to prevent its rolling too far. The unloading then proceeds as heretofore described.

What I claim as my invention is:

1. A log raft comprising a plurality of non-connected buoyant logs, a non-buoyant container completely surrounding the logs, and means affording free communication for water between the inside and outside of said container.

2. The method of transporting logs which comprises filling a non-buoyant container partially full of water, discharging logs thereinto through an opening in its upper portion, the water cushioning the fall of the logs to prevent impact thereof against the container, closing the container opening, placing the interior of the container in communication with the water outside the container, moving the container to its destination, cutting off communication between the outside and the inside of the container, pumping out sufficient water to relieve pressure of the logs against the opening closure, removing the closure means from the opening, and admitting water to the container to lift the upper logs through the opening by reason of the buoyancy of the lower logs.

3. The method of transporting floatable cargo which consists in discharging it within a substantially non-buoyant container, inverting such container, whereby any water within the container tends to float the cargo upward against the now upper portion of the container, and moving said container, thus filled, to the point of delivery.

4. A vessel comprising a container having a hatch opening extending lengthwise thereof, hatch cover means including a plurality of cover sections of a length a fraction of the length of said hatch opening, means to support each section at one side of the hatch opening, and means on each cover section cooperating with other such means on adjacent cover sections to load logs and to effect discharge thereof through the hatch opening.

5. A vessel comprising a container having a hatch opening extending lengthwise thereof, a plurality of hatch cover sections of a length a fraction of the length of said hatch opening, hingedly mounted along one side of said opening to swing into sealing registry therewith and to swing into open position to form a substantially horizontal platform along one side of said opening, and spaced rails on each cover section extending parallel to the hatch opening, the rails on adjacent cover sections cooperating, when the sections are in open position, to guide logs for movement lengthwise of the hatch opening.

6. A vessel comprising a container having a plurality of hatch openings extending lengthwise thereof, hatch cover means for each opening, means to support each hatch cover means in open position adjacent to its hatch opening, and means on each hatch cover means aligned with other such means on adjacent hatch cover means when disposed in open position, to guide logs for movement lengthwise of the hatch openings.

7. The method of preparing logs for transportation in a non-buoyant container, which comprises discharging logs into such a container, impounding the logs therein, and sustaining the non-buoyant container with its upper side awash solely by the buoyancy of the impounded logs by establishing free communication for water between the inside and outside of the container.

8. A log-transporting craft comprising a non-buoyant, substantially unbraced shell, and combined sustaining and strain-eliminating means for said craft consisting of a mixture of logs and water substantially filling said shell, to equalize the internal and external pressures and to sustain the craft with its upper side awash.

9. A log-transporting craft comprising a non-buoyant shell, means establishing free communication for water between the inside and outside of the shell, and sustaining means for said shell consisting of a mixture of logs and water substantially filling said shell, to equalize the internal and external pressures and to sustain the craft with its upper side awash.

WALTER B. FOGH.